Dec. 23, 1952 N. R. BEST 2,623,195
CATHODE-RAY DYNAMIC FOCUSING CIRCUIT
Filed Jan. 4, 1951
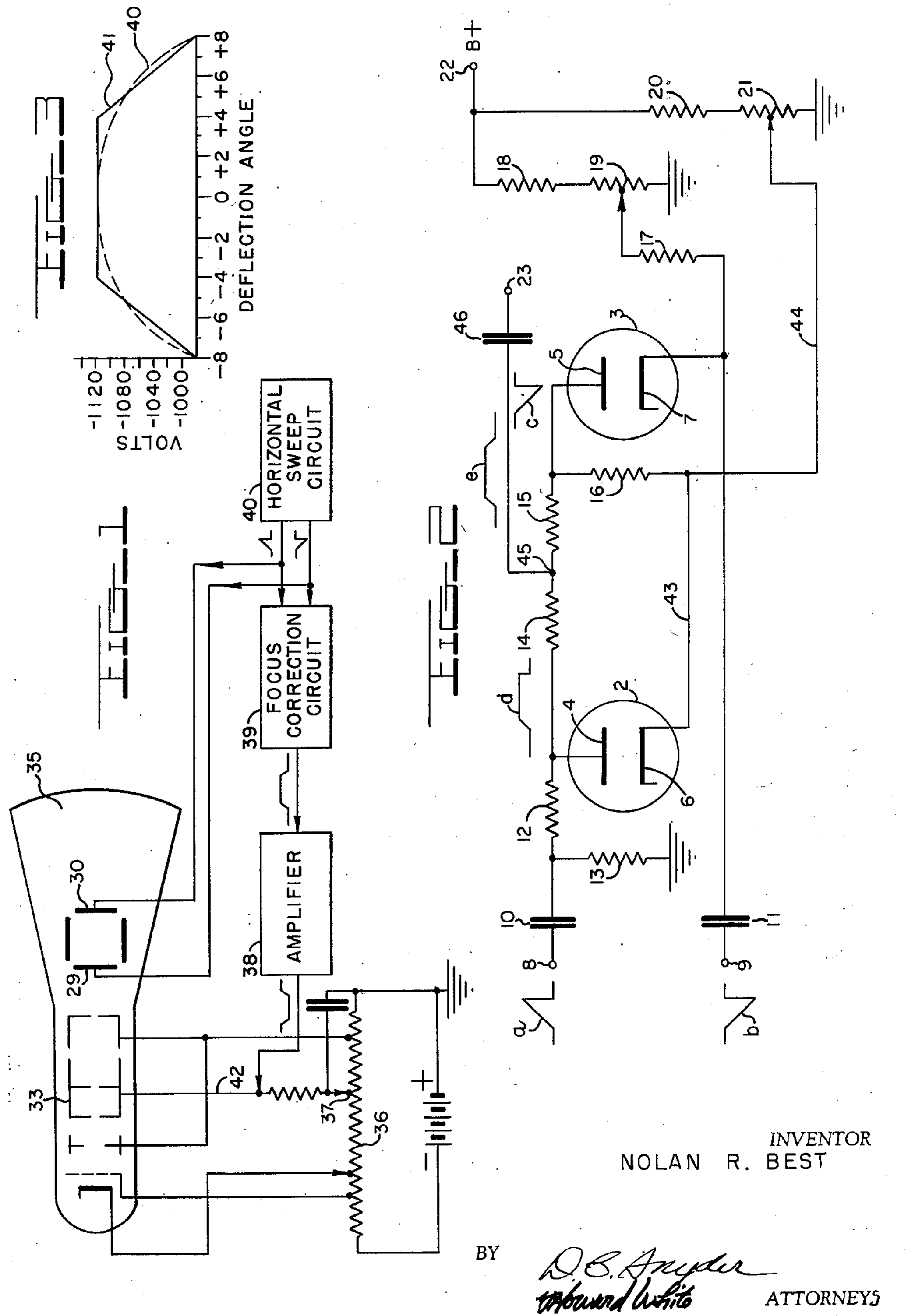
INVENTOR
NOLAN R. BEST
BY D. B. Snyder
Howard White
ATTORNEYS Patented Dec. 23, 1952 2,623,195

UNITED STATES PATENT OFFICE 2,623,195

CATHODE-RAY DYNAMIC FOCUSING CIRCUIT

Nolan R. Best, Avondale, Md.

Application January 4, 1951, Serial No. 204,451

5 Claims. (Cl. 315—22)

(Granted under the act of March 3, 1883, as amended April 30, 1928; 370 O. G. 757)

This invention relates in general to cathode ray tube focusing circuits and in particular to a means for obtaining uniform focus of the electron beam as it is deflected across the screen of a cathode ray tube.

There is generally provided in the conventional electrostatic deflection cathode ray tubes a fixed direct current potential on the second or focus anode. Because of the geometry of the face of the cathode ray tube, the amount of potential necessary to focus the electron beam at the center of the tube differs from that when the electron beam is at either of the extremities of the tube. Since in the conventional systems the focus electrode potential is more or less fixed, it is usually adjusted as a compromise to give an average focus of the electron beam as it is deflected from one end of the screen of the cathode ray tube to the other. Accordingly, an optimum focus of the electron beam is neither had at the center of the screen nor at the extremities. In some visual systems such as television, although it may not be desirable and somewhat distracting, a critical overall detailed definition is not essential and the conventional means of obtaining an average focus potential may suffice.

There are certain other systems however, employing a cathode ray tube indicator, wherein it is absolutely essential that the electron beam have optimum focus throughout its deflection across the screen of the cathode ray tube. One such system is disclosed and described in the copending application of S. W. Lichtman et al., Serial No. 67,904, filed December 29, 1948. The Lichtman et al. system is a telemetering system wherein the intelligence presented on the cathode ray tube indicator is continuously photographed. It is obvious that in photographing techniques it is essential that the electron beam must have optimum focus at all times to be properly photographed.

The present invention teaches in a simple expedient manner, means for producing a voltage waveform, directly dependent upon the deflection of the electron beam, and of applying this voltage to the direct current focus anode. This voltage when added to the fixed potential of the focus anode corrects the fixed potential in a manner that closely approximates the voltage necessary for maintaining optimum focus of the electron beam as it is deflected across the screen of the cathode ray tube.

It is accordingly an object of the present invention to provide a new and improved dynamic focus control circuit for a cathode ray tube indicator.

A further object of the present invention is to provide a new and improved focus control circuit for automatically focusing the electron beam throughout its deflection across the screen of the cathode ray tube indicator.

Another object of the present invention is to provide a new and improved focus control circuit for automatically focusing the electron beam of a cathode ray tube regardless of the sweep duration.

Still another object of the present invention is to provide a new and improved focus control circuit that is simple in design, requiring a minimum number of components and is readily adaptable to conventional electrostatic cathode ray tube indicator circuits.

Further objects and attainments of the present invention will become readily apparent upon a careful consideration of the following detailed description when taken in conjunction with the drawings in which:

Fig. 1 is a block schematic diagram of the present invention as incorporated in a conventional electrostatic deflection cathode ray tube indicator.

Fig. 2 is a circuit schematic diagram of the focus correction circuit shown in block in Fig. 1.

Fig. 3 is a graph illustrating the potential variations at the focus anode necessary for obtaining optimum focus of the electron beam relative to the deflection of the electron beam.

In general and in accordance with the spirit and scope of the present invention a voltage converter is provided to produce a voltage signal having a waveform that approximates the potential variations necessary for obtaining optimum focus of the electron beam throughout its deflection across the screen of the cathode ray tube indicator. To obtain this voltage signal, the deflection voltage itself is converted into the proper shape by the circuit of the present invention. By so converting the existing deflection voltage (usually a sawtooth signal) no additional generator is necessary and also of importance the voltage is dependent upon the sweep to thereby become a function of the sweep duration. It is seen then that by changing the sweep duration the curve of the converted voltage is also changed and the correcting voltage circuit of the present invention is equally operative at any sweep duration chosen.

The converted voltage waveform, when sawtooth deflection voltages are used, essentially consists of a clipped and combined sawtooth waveform as hereinafter explained and resembles in detail a truncated triangular wave that may be adjusted as to the relative duration of the sloping sides and the flat top. The converted voltage waveform is coupled by suitable means to the direct current focus anode to correct the focus anode potential of the cathode ray tube to more nearly approximate that necessary to obtain optimum focus over the entire sweep of the electron beam.

Referring now to Fig. 1 there is illustrated a block schematic circuit diagram of an electrostatic cathode ray tube and its sweep circuits in conjunction with the circuit of the present invention shown in block. The construction of cathode ray tube indicator 35 is conventional, having horizontal deflecting plates 29 and 30 and a second anode or focus electrode 33. In a conventional manner the electron beam is deflected horizontally by plates 29 and 30 from a push-pull sawtooth waveform signal from horizontal sweep oscillator circuit 40. It may be pointed out here that in some instances, such as in the Lichtman et al. application, supra, that the vertical deflection is not employed, and only a single horizontal trace appears across the face of the cathode ray tube indicator, however, in other known systems the horizontal deflection is not employed and only the vertical trace appears across the face of the cathode ray tube. The present invention is, of course, readily adaptable to either deflection. A direct current potential is applied in a conventional manner to the focus anode 33 from a potential source 36 from tap point 37 over lead wire 42.

As will be explained hereinafter with respect to Figs. 2 and 3, the potential at anode 33 necessary for maintaining optimum focus of the electron beam at it is deflected from one end of the face of the screen of cathode ray tube 35 to the other end is not constant. Generally, a compromise is had and the direct current potential at anode 33 is an average potential. Just as in any compromise, there is a sacrifice, in one instance the electron beam is out of focus primarily at the extremities of the cathode ray tube screen and in other instances it may be out of focus at the center of the tube. In those instances where a permanent record of the intelligence presented on the cathode ray tube is desired, such as by photographing, the normal procedure of focusing the electron beam is entirely unsatisfactory.

To provide dynamic focusing as taught by the present invention there is applied to line 42, which normally supplies the direct current potential to anode 33, a correction voltage from focus correction circuit 39. Focus correction circuit 39 is shown in circuit detail in Fig. 2 and will be explained in conjunction therewith. Focus correction circuit 39, however, functions to correct the direct current voltage applied to anode 33 to a value that closely approximates the value necessary for obtaining optimum focus of the electron beam throughout its sweep to permit either a better visual presentation or to permit the proper photographing of the intelligence presented by cathode ray tube indicator 35.

There is disclosed in the Lichtman et al. application, supra, a cathode ray tube photographing system for a telemetering communication system. The telemetering communication system in actual operation contains thirty channels and one of the features as described in the Lichtman et al. photographing cathode ray tube idicator system, is that any number of the channels one through thirty may be presented on the cathode ray tube indicator and photographed. This is made possible by controlling the starting time relative to the synchronizing pulse and thereby the duration of the sweep voltages, in accordance with the number of channels desired to be presented. The systems that attempt to correct the focus anode potential by external or independent means would not of course function with a change of sweep length or duration. As will be explained in conjunction with Fig. 2, the focus correction circuit 39 is fed by the same push-pull sawtooth voltage that is applied to the horizontal deflection plates 29 and 30 to control the sweep thereof. Thus it is seen if the horizontal sweep duration is changed such as in the Lichtman et al. application, supra, the voltage generated by the focus correction circuit 39 will accordingly follow the change. In brief then the correcting voltage for obtaining proper focus of the electron beam throughout its sweep is directly dependent on the sweep voltage and is equally as effective at any sweep duration.

Referring now to Fig. 2 there is shown the circuit diagram of the voltage correction circuit 39 of the present invention. In general and as here shown the circuit functions to limit and clip the positive sawtooth waveform of the push-pull input and further functions with the use of the negative sawtooth waveform to terminate the clipped waveform with a sloping edge. There is produced then a truncated triangular waveform that is applied to the focus anode potential circuit.

In operation of the circuit of Fig. 2, the positive going sawtooth waveform *a* is applied over input terminal 8. Capacitor 10 and resistor 13 having one end connected to ground serve as an R. C. coupling that establishes the stand-by potential on anode 4 of diode vacuum tube 2. Resistor 12 and diode vacuum tube 2 operate as a limiting network. Vacuum tube 2 is cathode biased over lead wires 43 and 44 from voltage divider network 20 and 21 connected between point of positive potential 22 and ground. In operation of vacuum tube 2, as the potential of the positive sawtooth voltage waveform rises the potential at anode 4 also rises and the output is equal to the input until the potential at anode 4 reaches the bias potential of cathode 6. When the potential at anode 4 reaches the potential of cathode 6 the tube begins to conduct and the potential at anode 4 remains substantially constant for any further rise of the potential of the sawtooth waveform *a*. There is produced then at the anode circuit 4 of vacuum tube 2 a clipped sawtooth waveform such as *d*, showing that the anode 4 potential rises during the first part of the sawtooth waveform *a* and then remaining constant for the remaining portion of the waveform.

The negative sawtooth waveform *b* of the push-pull pair is applied to terminal 9 through coupling capacitor 11 to cathode 7 of vacuum tube 3. Diode vacuum tube 3 is biased non-conducting through resistor 17 tied to cathode 7 and voltage divider 18 and 19 tied between point of positive potential 22 and ground. Anode 5 of vacuum tube 3 is held at the bias potential of cathode 6. As the voltage waveform *b*, applied to cathode 7, drops in potential the potential of cathode 7 is eventually reached where diode 3 conducts and thereafter plate 5 starts to follow the potential change impressed on the cathode. Any further lowering of the potential of cathode 7 will proportionally lower the potential at anode 5.

Resistors 14 and 15 are preferably exactly equal in ohmic value and the potential existing at junction point 45 is midway between the standby potentials of anodes 4 and 5. As the potential of anodes 4 and 5 change, as just described, the potential at junction point 45 changes half as much as the potential change at anodes 4 and 5. At junction point 45 then the potential first raises gradually with application of voltage as to a point where tube 2 starts to conduct and then remains at this fixed value until tube 3 starts to conduct, whereupon the potential at junction 45 starts to diminish. This waveform thus produced at junction 45 is the truncated triangular waveform shown at *e* with the initial portion of the waveform rising in conformity with the positive sawtooth wave *a*, then clipped as shown at *d* and terminated with a sloping edge in conformity with the waveform *c* as produced at anode 5 from the negative going sawtooth waveform *b*.

The voltage divider network comprising resistor 20 and potentiometer 21 serially connected between point of positive potential 22 and ground, is operative through adjustment of potentiometer 21 to vary the ratio of the clipped level of waveform *d* and the slope of the rising voltage.

The truncated triangular waveform *e* appearing at junction point 45 is applied over capacitor 46 and terminal 23 to suitable amplifying means shown at 38 in Fig. 1. As previously described this correcting waveform is applied to the focus anode potential to correct the focus of the electron beam as it is deflected across the face of the cathode ray tube indicator.

It was mentioned above that the necessary potential for the focus anode to maintain proper focus of the electron beam varies as the electron beam is deflected across the screen of the ray tube. It has been found that this potential variation follows the dotted line curve 40 of Fig. 3, to which reference may now be had. To obtain the optimum focus then it is necessary that the potential at the focus anode be varied according to curve 40. The truncated triangular waveform generated by the circuit illustrated in Fig. 2 is shown in Fig. 3 as 41. It is readily seen that this voltage waveform closely approximates curve 40 and when applied to the focus control electrode will closely approximate the optimum voltage for true focusing of the electron beam throughout its deflection. In actual practice of the present invention the focus potential is adjusted to correctly focus the electron beam at the extremities of its sweep and the truncated triangular waveform as shown in Fig. 3 is applied to the focus anode to correctly focus the electron beam throughout the sweep. A modification of this practice may be had by correctly focusing the electron beam at the center rather than the extremities of the sweep and applying a complementary truncated triangular waveform to that shown in Fig. 3 to the focus anode to correctly focus the electron beam throughout the sweep.

Although there have been shown only certain and specific embodiments of the present invention it is understood that many modifications may be had without departing from the true spirit and scope of the invention.

The invention described herein may be manufactured and used by or for the Government of the United States of America for governmental purposes without the payment of any royalties thereon or therefor.

What is claimed is:

1. In combination, a cathode ray tube having at least a pair of electrostatic deflecting plates and a focusing electrode, a sweep generator circuit connected to said deflecting plates for deflecting the electron beam of said cathode ray tube, voltage converter means connected in parallel with said deflection plates and operative on the sweep voltage pulses fed thereto to produce signal pulses respectively coextensive with said sweep pulses, said signal pulses having sloping leading and trailing edges, and means for coupling the output of said converter means to said focusing electrode for correcting the focus of said electron beam throughout the deflection thereof.

2. In combination, a cathode ray tube having at least a pair of electrostatic deflection plates and a focusing electrode, a sweep generator circuit connected to said deflecting plates for deflecting the electron beam of said cathode ray tube, means for applying a fixed direct current potential to said focusing electrode to focus the electron beam at one portion of the sweep path, a voltage converter connected in parallel with said deflecting plates and operative on the sweep voltage pulses fed thereto to produce signal pulses respectively coextensive with said sweep pulses, said signal pulses having sloping leading and trailing edges, and means for coupling the output of said converter to said focusing electrode for correcting the focus of said electron beam throughout the deflection thereof.

3. In combination, a cathode ray tube having at least a pair of electrostatic deflecting plates and a focusing electrode, a push-pull saw-tooth generator coupled to said deflecting plate for deflecting the electron beam of said cathode ray tube, means for applying a fixed direct current potential to said focusing electrode to focus the electron beam at one portion of the sweep path, a voltage converter also fed by said push-pull sawtooth generator including a first vacuum tube circuit operative to clip the positive going sawtooth voltage from said push-pull generator, a second vacuum tube circuit operative to produce from the negative going sawtooth voltage from said push-pull generator a declining potential waveform of the same amplitude as the clipped voltage waveform from said first vacuum tube circuit, means for combining said clipped waveform and said declining potential waveform, and means for coupling the output of said varying potential generator to the focusing electrode of said cathode ray tube for correcting the focus of said electron beam through said deflection.

4. In combination, a cathode ray tube having at least a pair of electrostatic deflecting plates and a focusing electrode, a push-pull sawtooth voltage generator coupled to said deflecting plates for deflecting the electron beam of said cathode ray tube; means for applying a fixed direct current potential to said focusing electrode to focus the electron beam at one portion of the sweep path, a voltage converter also fed by said push-pull sawtooth voltage generator including: a first vacuum tube having at least an anode and a cathode, means for applying the positive going sawtooth wave signal from said push-pull generator to said anode, means connected to said cathode to control the conductivity period of said vacuum tube to clip said sawtooth voltage waveform at a predetermined level, a second vacuum tube having at least an anode and a cathode, means connected to said cathode to maintain said anode at a predetermined potential, and means for applying said negative going sawtooth wave signal to said cathode to cause said anode to follow the potential change impressed on said cathode, means connecting the anodes of said first and second vacuum tubes for combining said clipped sawtooth wave signal and said changing potential signal, means for coupling said converted voltage to the focusing electrode of said cathode ray tube to correct the focus of said electron beam during deflection.

5. In combination, a cathode ray tube having at least a pair of electrostatic deflecting plates and a focusing electrode, a push-pull sawtooth voltage generator coupled to said deflecting plates for deflecting the electron beam of said cathode ray tube, means for applying a fixed direct current potential to said focusing electrode to focus the electron beam at one portion of the sweep path, a voltage converter also fed by said push-pull sawtooth generator including: a first vacuum tube having at least an anode and a cathode, means for applying the positive going sawtooth signal from said push-pull generator to said anode, means connected to said cathode to control the conductivity period of said vacuum tube to clip said sawtooth waveform at a predetermined level, a second vacuum tube having at least an anode and a cathode, means connected to said cathode to maintain said anode at a predetermined potential, means for connecting the negative going sawtooth voltage from said push-pull generator to said cathode to cause said anode to follow the potential change impressed on said cathode, and a pair of resistive elements of equal ohmic value serially connecting the anodes of said first and second vacuum tubes to combine said clipped signal and said changing potential signal; means connected to the junction point of said series resistive elements for coupling said converted voltage waveform signal appearing thereat to said focusing electrode to correct the focus of said electron beam during deflection.

NOLAN R. BEST.

REFERENCES CITED

The following references are of record in the file of this patent:

UNITED STATES PATENTS

| Number | Name | Date |
|---|---|---|
| 2,255,485 | Dome | Sept. 9, 1941 |
| 2,430,331 | Galella et al. | Nov. 4, 1947 |
| 2,440,263 | Grieg | Apr. 27, 1948 |
| 2,449,524 | Witherby et al. | Sept. 14, 1948 |
| 2,472,165 | Mankin | June 7, 1949 |
| 2,514,079 | Lockhart | July 4, 1950 |